United States Patent
Wang et al.

(10) Patent No.: US 9,426,454 B2
(45) Date of Patent: Aug. 23, 2016

(54) 3D DISPLAY SYSTEM AND METHOD THEREOF

(75) Inventors: Chih-Li Wang, New Taipei (TW); Ming-Jen Chan, New Taipei (TW); Yi-Cheng Lee, New Taipei (TW)

(73) Assignee: Wistron Corp., New Taipei (TW)

( * ) Notice: Subject to any disclaimer, the term of this patent is extended or adjusted under 35 U.S.C. 154(b) by 585 days.

(21) Appl. No.: 13/474,595

(22) Filed: May 17, 2012

(65) Prior Publication Data

US 2012/0320172 A1 Dec. 20, 2012

(30) Foreign Application Priority Data

Jun. 17, 2011 (TW) .............................. 100121164 A (51) Int. Cl.
| | | |
|---|---|---|
| *G06T 15/00* | (2011.01) | |
| *H04N 13/04* | (2006.01) | |
| *G02B 27/22* | (2006.01) | |

(52) U.S. Cl.
CPC ........ *H04N 13/0438* (2013.01); *G02B 27/2264* (2013.01); *H04N 13/0497* (2013.01)

(58) Field of Classification Search
CPC ........... G02B 27/2264; H04N 13/0438; H04N 13/0497; H04N 13/0402; H04N 13/0429; H04N 13/0434; H04N 13/0232; H04N 13/0431
USPC .......................................................... 348/56
See application file for complete search history.

(56) References Cited

U.S. PATENT DOCUMENTS

| | | | | |
|---|---|---|---|---|
| 4,429,951 A | * | 2/1984 | Hirano | G02B 27/2221 351/57 |
| 4,705,371 A | * | 11/1987 | Beard | H04N 13/0431 348/E13.037 |
| 4,717,239 A | * | 1/1988 | Steenblik | G02B 5/04 348/E13.033 |
| 4,893,898 A | * | 1/1990 | Beard | H04N 13/0431 348/60 |
| 5,144,344 A | * | 9/1992 | Takahashi | G02C 7/105 348/E13.037 |
| 5,717,415 A | * | 2/1998 | Iue | H04N 13/0051 345/419 |

(Continued)

FOREIGN PATENT DOCUMENTS

| | | |
|---|---|---|
| CN | 101866055 | 10/2010 |
| CN | 101900885 A | 12/2010 |

(Continued)

OTHER PUBLICATIONS

China Patent Office, Office Action, Patent Application Serial No. 201110206347.8, Apr. 24, 2014, China.

(Continued)

*Primary Examiner* — Shan Elahi (57) ABSTRACT

A 3D display system is provided. The 3D display system includes a shutter glasses, a display apparatus and a transmitter module. The shutter glasses includes a left eye shutter and a right eye shutter. The shutter glasses controls a switching frequency of the left eye shutter and the right eye shutter according to a radio frequency signal. The display apparatus alternately displays left and right eye images according to an update frequency. The transmitter module detects the update frequency and provides the radio frequency signal to the shutter glasses when detecting that the update frequency has changed, wherein the radio frequency signal includes the changed update frequency.

28 Claims, 5 Drawing Sheets

(56) References Cited

U.S. PATENT DOCUMENTS

| | | | | |
|---|---|---|---|---|
| 5,821,989 | A * | 10/1998 | Lazzaro | G03B 21/30 348/53 |
| 6,115,177 | A * | 9/2000 | Vossler | G02B 27/26 348/E13.023 |
| 6,503,195 | B1 * | 1/2003 | Keller et al. | 600/160 |
| 6,961,459 | B2 * | 11/2005 | Takeuchi | G06K 9/00154 345/419 |
| 7,218,339 | B2 * | 5/2007 | Jacobs | H04N 13/0438 348/42 |
| 7,405,801 | B2 * | 7/2008 | Jacobs | G02B 27/22 348/53 |
| 7,850,304 | B2 * | 12/2010 | Jacobs | G02B 26/026 351/159.6 |
| 7,971,994 | B2 * | 7/2011 | Blum | G02C 7/08 345/7 |
| 7,976,159 | B2 * | 7/2011 | Jacobs | G02B 27/017 351/159.76 |
| 8,228,365 | B2 * | 7/2012 | Toma | H04N 13/0221 348/42 |
| 8,233,103 | B2 | 7/2012 | MacNaughton et al. | |
| 8,301,013 | B2 | 10/2012 | Yamashita et al. | |
| 8,303,112 | B2 * | 11/2012 | Jacobs | G02B 27/017 351/158 |
| 8,416,288 | B2 * | 4/2013 | Mizutani | H04N 13/0022 348/42 |
| 8,514,225 | B2 * | 8/2013 | Genova | G06T 15/205 345/422 |
| 8,625,970 | B2 * | 1/2014 | Toma | H04N 13/0055 348/43 |
| 8,657,438 | B2 * | 2/2014 | Jacobs | G02B 26/026 349/13 |
| 8,657,439 | B2 * | 2/2014 | Jacobs | G02B 27/017 351/159.01 |
| 8,670,607 | B2 * | 3/2014 | Inoue | G09G 3/003 348/47 |
| 8,864,304 | B2 * | 10/2014 | Jacobs | G02B 26/026 351/159.39 |
| 2002/0039230 | A1 * | 4/2002 | Lin | G02B 27/26 359/465 |
| 2003/0007681 | A1 * | 1/2003 | Baker | G02B 27/2228 382/154 |
| 2003/0030904 | A1 * | 2/2003 | Huang | G02B 27/2221 359/466 |
| 2004/0036708 | A1 * | 2/2004 | Evanicky et al. | 345/691 |
| 2005/0073586 | A1 * | 4/2005 | Li et al. | 348/207.1 |
| 2005/0259159 | A1 * | 11/2005 | Horimai et al. | 348/222.1 |
| 2007/0035707 | A1 * | 2/2007 | Margulis | G03B 21/26 353/122 |
| 2007/0146360 | A1 * | 6/2007 | Clatworthy | G06T 15/20 345/419 |
| 2007/0206155 | A1 * | 9/2007 | Lipton | G03B 21/32 353/7 |
| 2007/0263003 | A1 * | 11/2007 | Ko et al. | 345/502 |
| 2007/0268236 | A1 * | 11/2007 | Morrow | 345/102 |
| 2008/0043203 | A1 * | 2/2008 | Jacobs | G03B 35/16 352/63 |
| 2008/0062259 | A1 * | 3/2008 | Lipton | H04N 13/0434 348/58 |
| 2009/0066863 | A1 * | 3/2009 | Chen | G02F 1/13363 349/13 |
| 2009/0167845 | A1 * | 7/2009 | Khan | H04N 13/0438 348/51 |
| 2009/0219283 | A1 * | 9/2009 | Hendrickson | H04N 13/0022 345/420 |
| 2010/0039504 | A1 * | 2/2010 | Takahashi et al. | 348/54 |
| 2010/0149320 | A1 | 6/2010 | MacNaughton et al. | |
| 2010/0149636 | A1 | 6/2010 | MacNaughton et al. | |
| 2010/0157027 | A1 | 6/2010 | MacNaughton et al. | |
| 2010/0157028 | A1 | 6/2010 | MacNaughton et al. | |
| 2010/0157031 | A1 | 6/2010 | MacNaughton et al. | |
| 2010/0157178 | A1 | 6/2010 | MacNaughton et al. | |
| 2010/0165085 | A1 | 7/2010 | MacNaughton et al. | |
| 2010/0177174 | A1 * | 7/2010 | Ko et al. | 348/56 |
| 2010/0177254 | A1 | 7/2010 | MacNaughton et al. | |
| 2010/0194857 | A1 * | 8/2010 | Mentz et al. | 348/43 |
| 2010/0245693 | A1 | 9/2010 | MacNaughton et al. | |
| 2010/0295929 | A1 | 11/2010 | Yoshifuji et al. | |
| 2011/0012896 | A1 * | 1/2011 | Ji | H04N 13/0429 345/419 |
| 2011/0025821 | A1 * | 2/2011 | Curtis et al. | 348/43 |
| 2011/0050867 | A1 * | 3/2011 | Hasegawa et al. | 348/55 |
| 2011/0090324 | A1 * | 4/2011 | Mentz | H04N 13/0438 348/55 |
| 2011/0096147 | A1 * | 4/2011 | Yamazaki | H04N 13/0257 348/43 |
| 2011/0096832 | A1 * | 4/2011 | Zhang | G06T 7/0071 375/240.08 |
| 2011/0149028 | A1 * | 6/2011 | Klebanov et al. | 348/43 |
| 2011/0149053 | A1 * | 6/2011 | Ito et al. | 348/56 |
| 2011/0159929 | A1 * | 6/2011 | Karaoguz | H04N 13/0404 455/566 |
| 2011/0199464 | A1 | 8/2011 | MacNaughton et al. | |
| 2011/0211815 | A1 | 9/2011 | Yamashita et al. | |
| 2011/0234774 | A1 * | 9/2011 | Satoh et al. | 348/56 |
| 2011/0248859 | A1 * | 10/2011 | Park | H04N 13/0497 340/636.1 |
| 2011/0249102 | A1 | 10/2011 | MacNaughton et al. | |
| 2011/0254934 | A1 * | 10/2011 | Yoon et al. | 348/56 |
| 2011/0285823 | A1 * | 11/2011 | Nabs et al. | 348/46 |
| 2012/0176366 | A1 * | 7/2012 | Genova | G06T 15/205 345/419 |
| 2012/0176473 | A1 * | 7/2012 | Genova | H04N 13/0011 348/46 |
| 2013/0021435 | A1 | 1/2013 | Yamashita et al. | |
| 2013/0033588 | A1 * | 2/2013 | Shiomi | G02B 27/26 348/58 |
| 2014/0022361 | A1 | 1/2014 | Yoshifuji et al. | |

FOREIGN PATENT DOCUMENTS

| | | |
|---|---|---|
| CN | 201805518 U | 4/2011 |
| CN | 101536038 B | 5/2011 |
| TW | 201032577 A1 | 9/2010 |
| TW | 201112736 A1 | 4/2011 |

OTHER PUBLICATIONS

Taiwan Patent Office, Office Action, Patent Application Serial No. 100121164, Aug. 26, 2014, Taiwan.

China Patent Office, Office Action, Patent Application Serial No. 201110206347.8, Nov. 3, 2014, China.

China Patent Office, Office Action, Patent Application Serial No. 201110206347.8, Apr. 3, 2015, China.

* cited by examiner

FIG. 5

3D DISPLAY SYSTEM AND METHOD THEREOF

CROSS REFERENCE TO RELATED APPLICATIONS

This Application claims priority of Taiwan Patent Application No. 100121164, filed on Jun. 17, 2011, the entirety of which is incorporated by reference herein.

BACKGROUND OF THE DISCLOSURE

1. Field of the Disclosure

The disclosure relates to a three-dimensional (3D) display system, and more particularly to a 3D display system with shutter glasses.

2. Description of the Related Art

A three-dimensional (3D) image is formed according to the principle of stereoscopic vision through the eyes of a human being. Binocular parallax, which is generated due to the distance between the human eyes, can be considered as the most important factor inducing a cubic effect.

In general, a 3D display apparatus shows a left eye image and a right eye image for the left and right eye of a human being, respectively, to obtain a cubic effect. For example, a left eye image and a right eye image are alternately displayed by a 3D display apparatus in time series. Thus, a user can wear a particular glasses to view a 3D image. The particular glasses is roughly classified into a active glasses and a passive glasses. The active glasses is also known as a shutter glasses. The shutter glasses is widely used due to less shadow. The shutter glasses controls the opening and closing operations of a left eye shutter and a right eye shutter according to a timing signal from the 3D display apparatus, such that only the left eye image is seen by the left eye of the user and only the right eye image is seen by the right eye of the user. Specifically, a right eye shutter is opened and a left eye shutter is closed when a right eye image is displayed by a 3D display apparatus. On the other hand, the left eye shutter is opened and the right eye shutter is closed when a left eye image is displayed by the 3D display apparatus.

However, if the 3D display apparatus frequently sends the timing signal to the shutter glasses, power consumption for the shutter glasses is increased, thereby reducing useful life of a battery. On the contrary, if the 3D display apparatus reduces the frequency of sending the timing signal, asynchronization will occur between the 3D display apparatus and the shutter glasses and then generate a crosstalk phenomenon. For example, the user may view the left eye image and the right eye image simultaneously.

BRIEF SUMMARY OF THE DISCLOSURE 3D display systems and methods thereof are provided. An embodiment of a 3D display system is provided. A 3D display system comprises a shutter glasses, a display apparatus and a transmitter module. The shutter glasses comprises a left eye shutter and a right eye shutter, and the shutter glasses controls a switching frequency of the left eye shutter and the right eye shutter according to a radio frequency signal. The display apparatus alternately displays left and right eye images according to an update frequency. The transmitter module detects the update frequency and provides the radio frequency signal to the shutter glasses when detecting that the update frequency has changed, wherein the radio frequency signal comprises the changed update frequency.

Furthermore, another embodiment of a 3D display system is provided. The 3D display system comprises a shutter glasses, a graphics processor, a transmitter module and a panel module. The shutter glasses comprises a left eye shutter and a right eye shutter, and the shutter glasses controls a switching frequency of the left eye shutter and the right eye shutter according to a radio frequency signal. The graphics processor provides an update frequency, a left eye data and a right eye data. The transmitter module provides the radio frequency signal according to the update frequency. The panel module alternately displays left and right eye images according to the update frequency, the left eye data and the right eye data and provides the update frequency to the transmitter module.

Moreover, another embodiment of a 3D display system is provided. The 3D display system comprises a shutter glasses, a processing module, a panel module and a transmitter module. The shutter glasses comprises a left eye shutter and a right eye shutter, and the shutter glasses controls a switching frequency of the left eye shutter and the right eye shutter according to a radio frequency signal. The processing module provides an update frequency, a left eye data and a right eye data according to a video signal. The panel module alternately displays left and right eye images according to the update frequency, the left eye data and the right eye data. The transmitter module provides the radio frequency signal according to the update frequency.

In addition, another embodiment of a 3D display system is provided. The 3D display system comprises a shutter glasses, a display apparatus, an image converter coupled to the display apparatus and a transmitter module. The shutter glasses comprises a left eye shutter and a right eye shutter, and the shutter glasses controls a switching frequency of the left eye shutter and the right eye shutter according to a radio frequency signal. The display apparatus alternately displays left and right eye images according to the update frequency, a left eye data and a right eye data. The image converter provides the left eye data, the right eye data and the update frequency to the display apparatus. The transmitter module provides the radio frequency signal according to the update frequency.

Furthermore, an embodiment of a 3D display method for a 3D display system is provided. Left and right eye images are alternately displayed in a display apparatus of the 3D display system according to an update frequency, a left eye data and a right eye data. The update frequency is detected. A radio frequency signal is provided to a shutter glasses of the 3D display system when detecting that the update frequency has changed. The shutter glasses controls a switching frequency of a left eye shutter and a right eye shutter according to the radio frequency signal, and the radio frequency signal comprises the changed update frequency.

A detailed description is given in the following embodiments with reference to the accompanying drawings.

BRIEF DESCRIPTION OF DRAWINGS

The disclosure can be more fully understood by reading the subsequent detailed description and examples with references made to the accompanying drawings, wherein.

DETAILED DESCRIPTION OF THE DISCLOSURE

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1:
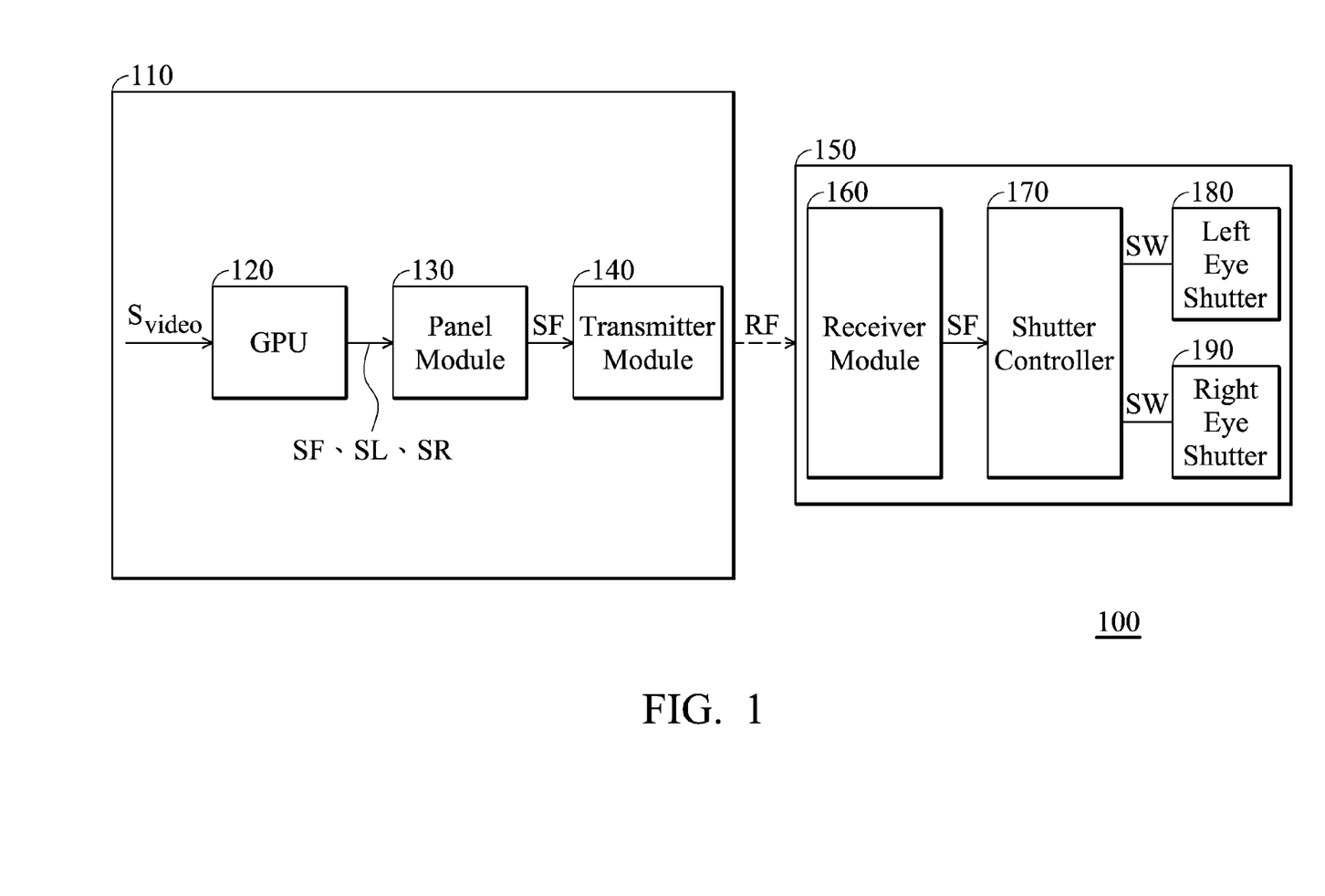
FIG. 1 shows a 3D display system according to an embodiment of the disclosure.

FIG. 1 shows a 3D display system 100 according to an embodiment of the disclosure. The 3D display system 100 comprises a computer 110 and a shutter glasses 150. The computer 110 comprises a graphics processor (GPU) 120, a panel module 130 and a transmitter module 140. The GPU 120 provides an update frequency SF, a left eye data SL and a right eye data SR to the panel module 130 according to a video signal $S_{video}$ to be displayed, wherein the video signal $S_{video}$ is provided by a hard disk, a CD-ROM drive, a memory or an external device (e.g. a multimedia player). Next, the panel module 130 alternately displays the left and right eye images according to the update frequency SF, the left eye data SL and the right eye data SR for a user to view. For example, if a 3D image is to be displayed by the computer 110 with a rate of 120 sheets per second (i.e. the update frequency SF is 120 Hz), the panel module 130 alternately updates the left and right eye images according to the left eye data SL and the right eye data SR with a rate of 120 sheets per second (120 Hz). Simultaneously, the panel module 130 also provides the update frequency SF to the transmitter module 140. Next, the transmitter module 140 transmits a radio frequency signal RF to the shutter glasses 150, wherein the radio frequency signal RF comprises information regarding the frequency of the update frequency SF. In general, the radio frequency signal RF could be in the form of the WIFI, Bluetooth, Zigbee, WiMax, RFID, Near Field Communication (NFC), or a combination thereof. The shutter glasses 150 comprises a receiver module 160, a shutter controller 170, a left eye shutter 180 and a right eye shutter 190. When receiving the radio frequency signal RF from the transmitter module 140, the receiver module 160 obtains the current update frequency SF of the panel module 130 according to the radio frequency signal RF, and provides the current update frequency SF to the shutter controller 170. Next, the shutter controller 170 obtains a switching frequency SW according to the current update frequency SF, so as to control the opening and closing operations of the left eye shutter 180 and the right eye shutter 190. For example, if the update frequency SF is 120 Hz, the switching frequency SW is 60 Hz. In the embodiment, the computer 110 only notifies the shutter glasses 150 of the update frequency SF, and then the shutter glasses 150 may automatically generate/count the switching frequency SW. Therefore, the transmitter module 140 transmits the update frequency SF from the panel module 130 to the shutter glasses 150 at a fixed time. In one embodiment, the transmitter module 140 further detects the update frequency SF. When it is detected that the update frequency SF has changed, such as frequency drift of an oscillator within the computer 110 will cause a change in the frequency of the update frequency SF, the transmitter module 140 transmits the changed update frequency SF (e.g. 118 Hz) to the shutter glasses 150. Thus, the shutter glasses 150 re-generates the switching frequency SW (e.g. 59 Hz) according to the changed update frequency SF, so that the opening and closing operations of the left eye shutter 180 and the right eye shutter 190 can synchronize the left eye image and the right eye image displayed in the panel module 130.

Figure 2:
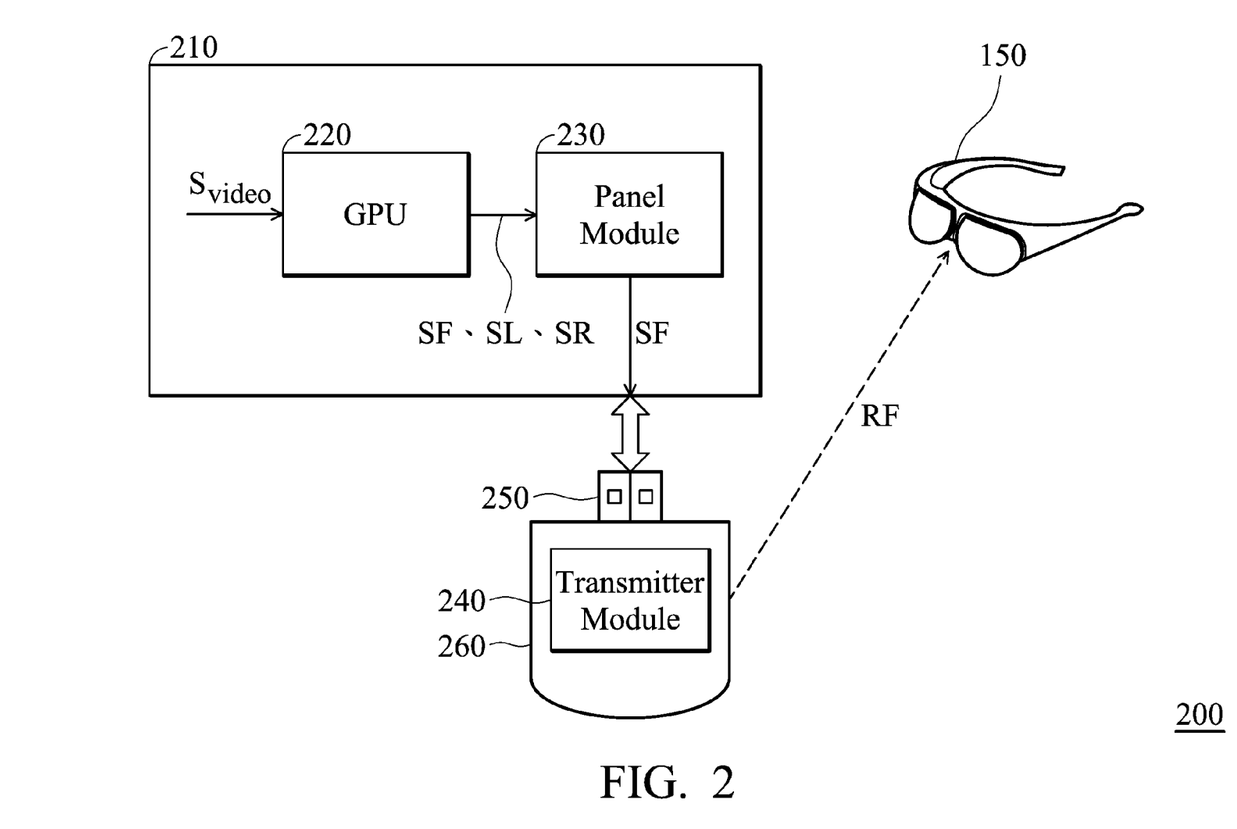
FIG. 2 shows a 3D display system according to another embodiment of the disclosure.

FIG. 2 shows a 3D display system 200 according to another embodiment of the disclosure. The 3D display system 200 comprises a computer 210, a dongle 260 and a shutter glasses 150. The computer 210 comprises a GPU 220 and a panel module 230. Compared with the computer 110 of FIG. 1, the computer 210 does not comprise a transmitter module. In the 3D display system 200, a transmitter module 240 is implemented in the dongle 260. The dongle 260 is an external device which couples to the computer 210 via a connector 250, wherein the connector 250 conforms to a specific transmission standard, such as universal serial bus (USB), PS/2, high definition multimedia interface (HDMI), peripheral component interconnect express (PCI express) micro card, power over external serial advanced technology attachment (eSATAp), IEEE 1394, secure digital (SD) card or other connection interfaces. Therefore, when the dongle 260 connects to the computer 210, the panel module 230 transmits the update frequency SF to the transmitter module 240 of the dongle 260. Next, the transmitter module 240 transmits the radio frequency signal RF comprising information regarding the update frequency SF to the shutter glasses 150. Thus, the opening and closing operations of the shutters of the shutter glasses 150 are synchronous to the update frequency SF of the panel module 230. As described above, the transmitter module 240 may further detect the update frequency SF. Once it is detected that the update frequency SF has changed, the transmitter module 240 transmits the changed update frequency SF to the shutter glasses 150. Thus, the shutter glasses 150 re-generates the switching frequency SW according to the changed update frequency SF.

Figure 3:
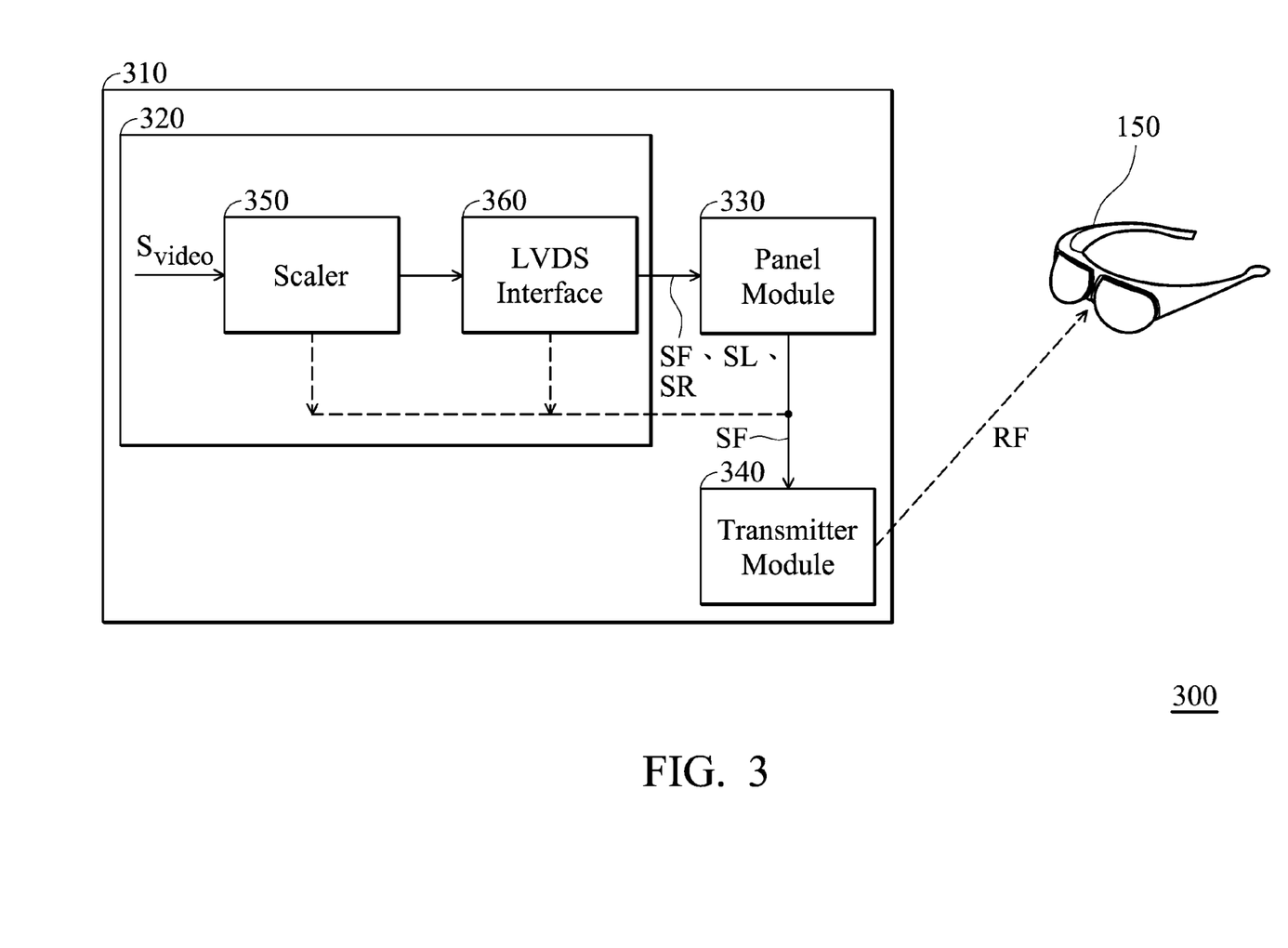
FIG. 3 shows a 3D display system according to another embodiment of the disclosure.

FIG. 3 shows a 3D display system 300 according to another embodiment of the disclosure. The 3D display system 300 comprises a television (TV) 310 and a shutter glasses 150. The TV 310 comprises a processing module 320, a panel module 330 and a transmitter module 340. The processing module 320 comprises a scaler 350 and a low voltage differential signaling (LVDS) interface 360. The scaler 350 performs an image scaling control according to a video signal $S_{video}$ to be displayed, so that the LVDS interface 360 can generate an update frequency SF, a left eye data SL and a right eye data SR that all conform to LVDS transmission standards, to the panel module 330. Similarly, the panel module 330 alternately displays the left and right eye images according to the update frequency SF, the left eye data SL and the right eye data SR for a user wearing the shutter glasses 150 to view. Furthermore, the panel module 330 provides the update frequency SF to the transmitter module 340. Next, the transmitter module 340 transmits a radio frequency signal RF to the shutter glasses 150, so as to notify the shutter glasses 150 of the current update frequency SF. Thus, the shutter glasses 150 adjusts the switching frequency SW of the shutters according to the received update frequency SF. It is to be noted that the scaler 350 and the LVDS interface 360 can also provide the update frequency SF to the transmitter module 340. As described above, the transmitter module 340 may further detect the update frequency SF. Once it is detected that the update frequency SF has changed, the transmitter module 340 transmits the changed update frequency SF to the shutter glasses 150. Thus, the shutter glasses 150 re-generates the switching frequency SW according to the changed update frequency SF. In addition, in another embodiment, the transmitter module 340 is implemented in an external dongle, and the external dongle is coupled to the TV 310 via a connector that conforms to a specific transmission standard.

Figure 4:
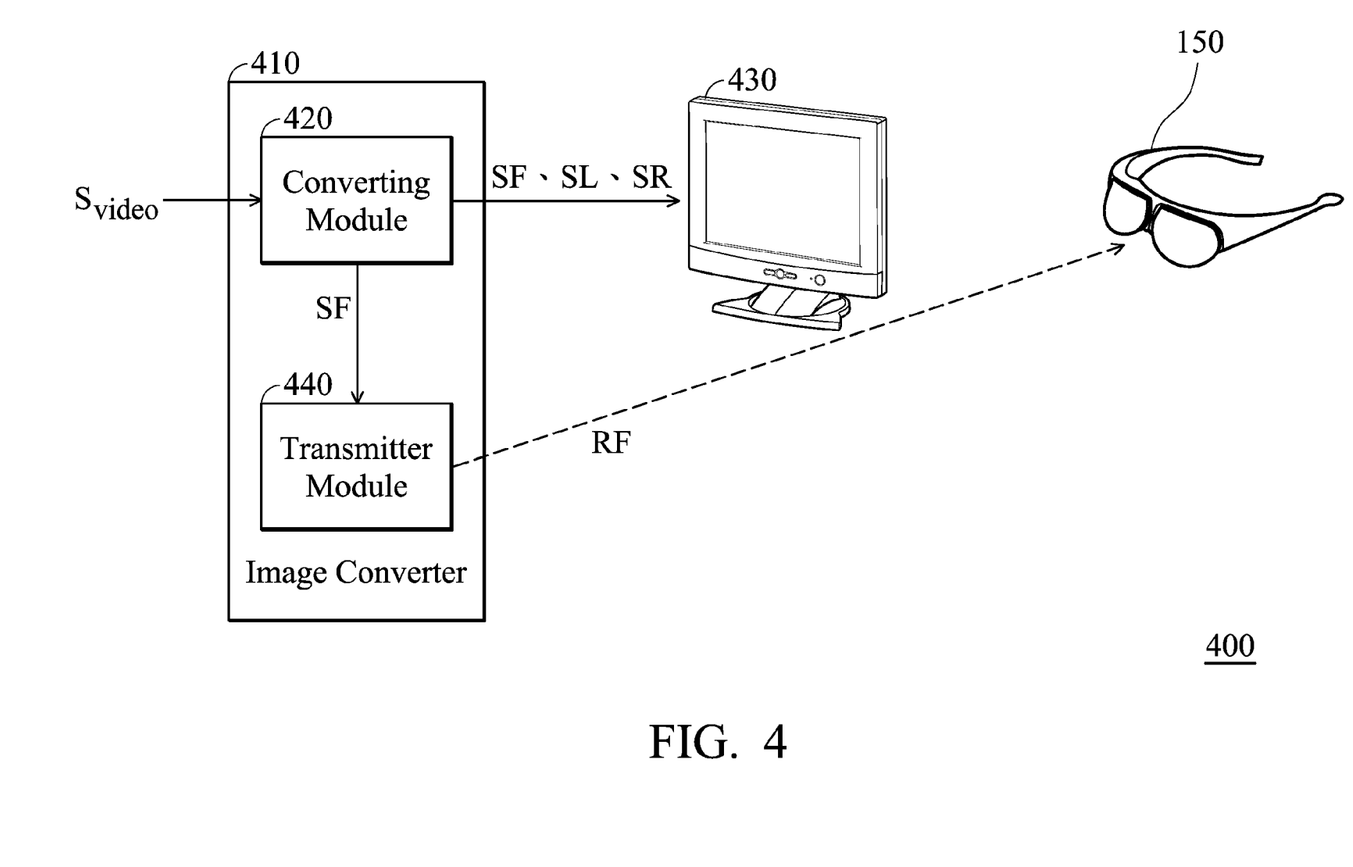
FIG. 4 shows a 3D display system according to another embodiment of the disclosure.

FIG. 4 shows a 3D display system 400 according to another embodiment of the disclosure. The 3D display system 400 comprises an image converter 410, a display 430 and a shutter glasses 150. In FIG. 4, the display 430 may be a computer or a TV, and the image converter 410 is externally coupled to the display 430. The image converter 410 comprises a converting module 420 and a transmitter module 440. In the image converter 410, it does not matter whether a video signal $S_{video}$ is 2D or 3D image data, the converting module 420 can convert the video signal $S_{video}$ to a left eye data SL and a right eye data SR with 3D image data, and then the converting module 420 can provide the update frequency SF, the left eye data SL and the right eye data SR to the displayer 430. Moreover, the converting module 420 also provides the update frequency SF to the transmitter module 440. Next, the transmitter module 440 transmits the radio frequency signal RF to the shutter glasses 150, so as to transmit the update frequency SF to the shutter glasses 150. Thus, the shutter glasses 150 adjusts the switching frequency SW of the shutters according to the received update frequency SF. Therefore, when the display 430 alternately displays the left and right eye images according to the update frequency SF, the left eye data SL and the right eye data SR, the shutter glasses 150 also controls the opening and closing operations of the shutters synchronously. In general, a user must wear a shutter glasses that is manufactured by the same manufacturer of a display, to view 3D image. However, in the embodiment, by using the image converter 410 externally coupled to the display 430, to transmit the update frequency SF to the shutter glasses 150, a user can wear the shutter glasses 150 to view the display 430 manufactured by other manufacturers, i.e. the shutter glasses 150 and the display 430 are manufactured by different manufacturers. As described above, the transmitter module 440 may further detect the update frequency SF. When it is detected that the update frequency SF has changed, the transmitter module 440 transmits the changed update frequency SF to the shutter glasses 150. Thus, the shutter glasses 150 re-generates the switching frequency SW according to the changed update frequency SF. Furthermore, in another embodiment, the transmitter module 440 is implemented in an external dongle, and the external dongle is coupled to the image converter 410 via a connector that conforms to a specific transmission standard.

Figure 5:
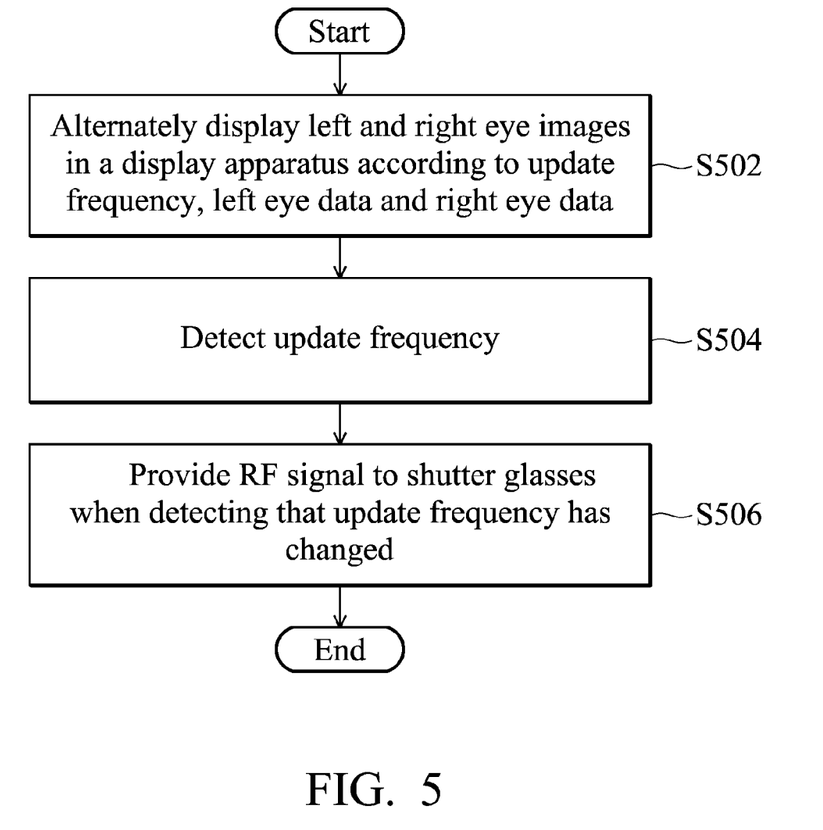
FIG. 5 shows a 3D display method for a 3D display system according to an embodiment of the disclosure.

FIG. 5 shows a 3D display method for a 3D display system, such as the 3D display system 100, 200, 300 or 400 described above, according to an embodiment of the disclosure. First, in step S502, according to an update frequency, a left eye data and a right eye data, the left and right eye images are alternately displayed in a display apparatus of the 3D display system, such as the panel module or display which are described above. Next, a transmitter module of the 3D display system detects the update frequency (step S504). Next, the transmitter module provides a radio frequency signal to a shutter glasses of the 3D display system when detecting that the update frequency has changed (step S506). The shutter glasses controls a switching frequency of the left and right eye shutters according to the radio frequency signal from the transmitter module. It is to be noted that the radio frequency signal from the transmitter module comprises the changed update frequency. Thus, the shutter glasses re-generates the switching frequency according to the changed update frequency, so that the opening and closing operations of the left and right eye shutters can synchronize the left and right eye images displayed in the display apparatus.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A 3D display system, comprising:
    a shutter glasses, comprising a left eye shutter, a right eye shutter, and a receiver module;
    a display apparatus, alternately displaying left and right eye images according to an update frequency; and
    a transmitter module, detecting an initial value of the update frequency, transmitting the initial value of the update frequency to the receiver module of the shutter glasses via a radio frequency signal, and then transmitting the update frequency to the shutter glasses only when detecting that the update frequency has changed;
    wherein a switching frequency of the left eye shutter and the right eye shutter is controlled according to the update frequency, and the update frequency represents a frame rate of the left and right eye images; and
    wherein the display apparatus comprises:
        a processing module, providing the update frequency, a left eye data and a right eye data; and
        a panel module, displaying the left and right eye images according to the update frequency, the left eye data and the right eye data.

2. The 3D display system as claimed in claim 1, wherein the shutter glasses further comprises:
    a shutter controller, obtaining the switching frequency according to the update frequency.

3. The 3D display system as claimed in claim 1, wherein the display apparatus is a computer and the processing module is a graphics processor.

4. The 3D display system as claimed in claim 1, wherein the display apparatus is a television, and the processing module comprises a scaler and a low voltage differential signaling (LVDS) interface.

5. The 3D display system as claimed in claim 1, wherein the transmitter module is implemented in the display apparatus.

6. The 3D display system as claimed in claim 1, wherein the transmitter module is implemented in an external dongle, and the external dongle is coupled to the display apparatus via a connector that conforms to a specific transmission standard.

7. A 3D display system, comprising:
    a shutter glasses, comprising a left eye shutter, a right eye shutter, and a receiver;
    a graphics processor, providing an update frequency, a left eye data and a right eye data;
    a transmitter module, transmitting the update frequency to the receiver of the shutter glasses via a radio frequency signal; and
    a panel module, alternately displaying left and right eye images according to the update frequency, the left eye data and the right eye data and providing the update frequency to the transmitter module;
    wherein a switching frequency of the left eye shutter and the right eye shutter is controlled according to the update frequency, the update frequency represents a frame rate of the left and right eye images; and
    wherein the transmitter module transmits an initial value of the update frequency to the shutter glasses, and then transmits the update frequency to the shutter glasses only when the graphics processor provides a changed update frequency.

8. The 3D display system as claimed in claim 7, wherein the graphics processor and the panel module are implemented in a computer.

9. The 3D display system as claimed in claim 8, wherein the transmitter module is implemented in the computer.

10. The 3D display system as claimed in claim 8, wherein the transmitter module is implemented in an external dongle, and the external dongle is coupled to the computer via a connector that conforms to a specific transmission standard.

11. A 3D display system, comprising:
- a shutter glasses, comprising a left eye shutter, a right eye shutter, and a receiver module;
- a processing module, providing an update frequency, a left eye data and a right eye data according to a video signal;
- a panel module, alternately displaying left and right eye images according to the update frequency, the left eye data and the right eye data; and
- a transmitter module, transmitting the update frequency to the receiver module of the shutter glasses via a radio frequency signal;
- wherein a switching frequency of the left eye shutter and the right eye shutter is controlled according to the update frequency, and the update frequency represents a frame rate of the left and right eye images; and
- wherein the transmitter module transmits an initial value of the update frequency to the shutter glasses, and then transmits the update frequency to the shutter glasses only when the processing module provides a changed update frequency.

12. The 3D display system as claimed in claim 11, wherein the panel module further provides the update frequency to the transmitter module.

13. The 3D display system as claimed in claim 11, wherein the processing module further provides the update frequency to the transmitter module, and the processing module comprises a scaler and a low voltage differential signaling (LVDS) interface.

14. The 3D display system as claimed in claim 11, wherein the processing module and the panel module are implemented in a television.

15. The 3D display system as claimed in claim 14, wherein the transmitter module is implemented in the television.

16. The 3D display system as claimed in claim 14, wherein the transmitter module is implemented in an external dongle, and the external dongle is coupled to the television via a connector that conforms to a specific transmission standard.

17. The 3D display system as claimed in claim 14, wherein the transmitter module is implemented in an external dongle, and the external dongle is coupled to the image converter via a connector that conforms to a specific transmission standard.

18. A 3D display system, comprising:
- a shutter glasses, comprising a left eye shutter, a right eye shutter, and a receiver module;
- a display apparatus, alternately displaying left and right eye images according to an update frequency, a left eye data and a right eye data;
- an image converter coupled to the display apparatus, providing the left eye data, the right eye data and the update frequency to the display apparatus; and
- a transmitter module, transmitting the update frequency to the receiver module of the shutter glasses via a radio frequency signal;
- wherein the display apparatus comprises:
  - a processing module, providing the update frequency, a left eye data and a right eye data; and
  - a panel module, displaying the left and right eye images according to the update frequency, the left eye data and the right eye data; and
- wherein a switching frequency of the left eye shutter and the right eye shutter is controlled according to the update frequency, and the update frequency represents a frame rate of the left and right eye images; and
- wherein the transmitter module transmits an initial value of the update frequency to the shutter glasses, and then transmits the update frequency to the shutter glasses only when the processing module provides a changed update frequency.

19. The 3D display system as claimed in claim 18, wherein the transmitter module is implemented in the image converter.

20. A 3D display method for a 3D display system comprising a display apparatus and a shutter glasses, the shutter glasses comprising a receiver module, the method comprising:
- alternately displaying left and right eye images in a display apparatus of the 3D display system according to an update frequency, a left eye data and a right eye data;
- detecting the update frequency; and
- transmitting an initial value of the update frequency to a shutter glasses of the 3D display system via a radio frequency signal transmitted to the receiver module, and then transmitting the update frequency to the shutter glasses only when detecting that the update frequency has changed;
- wherein a switching frequency of the left eye shutter and the right eye shutter is controlled according to the update frequency, and the update frequency represents a frame rate of the left and right eye images; and
- wherein the display apparatus comprises:
  - a processing module, providing the update frequency and the left and right eye data; and
  - a panel module, displaying the left and right eye images according to the update frequency and the left and right eye data.

21. The 3D display method as claimed in claim 20, wherein the processing module further provides the update frequency to a transmitter module, wherein the transmitter module detects the update frequency to provide the radio frequency signal.

22. The 3D display method as claimed in claim 21, wherein the transmitter module is implemented in the display apparatus.

23. The 3D display method as claimed in claim 21, wherein the transmitter module is implemented in an external dongle, and the external dongle is coupled to the display apparatus via a connector that conforms to a specific transmission standard.

24. The 3D display method as claimed in claim 20, wherein the display apparatus is a computer and the processing module is a graphics processor.

25. The 3D display method as claimed in claim 20, wherein the display apparatus is a television, and the processing module comprises a scaler and a low voltage differential signaling (LVDS) interface.

26. The 3D display method as claimed in claim 20, further comprising:
- providing the left and right eye data and the update frequency according to a video signal by an image converter coupled to the display apparatus.

27. The 3D display method as claimed in claim 26, wherein the image converter further provides the update frequency to a transmitter module, wherein the transmitter module detects the update frequency to provide the radio frequency signal.

28. The 3D display method as claimed in claim 27, wherein the transmitter module is implemented in the image converter.

* * * * *